US012767785B2

(12) United States Patent
Lee et al.

(10) Patent No.: US 12,767,785 B2
(45) Date of Patent: Oct. 20, 2026

(54) POLYAMIDE RESIN COMPOSITION

(71) Applicants: HYUNDAI MOTOR COMPANY, Seoul (KR); KIA CORPORATION, Seoul (KR); KOLON PLASTICS, INC., Gimcheon-si (KR)

(72) Inventors: Dong Jun Lee, Suwon-si (KR); Gi Bong Chung, Daegu (KR); Soo Yeon Park, Gimcheon-si (KR)

(73) Assignees: HYUNDAI MOTOR COMPANY, Seoul (KR); KIA CORPORATION, Seoul (KR); Kolon INDUSTRIES, INC., Seoul (KR)

( * ) Notice: Subject to any disclaimer, the term of this patent is extended or adjusted under 35 U.S.C. 154(b) by 634 days.

(21) Appl. No.: 18/216,787

(22) Filed: Jun. 30, 2023

(65) Prior Publication Data

US 2024/0117146 A1 Apr. 11, 2024

(30) Foreign Application Priority Data

Oct. 11, 2022 (KR) ........................ 10-2022-0129424

(51) Int. Cl.

| | |
|---|---|
| ***C08K 3/04*** | (2006.01) |
| ***C08K 7/06*** | (2006.01) |
| ***C08L 101/00*** | (2006.01) |
| *C08L 33/24* | (2006.01) |
| *C08L 77/00* | (2006.01) |
| *C08L 77/02* | (2006.01) |
| *C08L 77/04* | (2006.01) |
| *C08L 77/06* | (2006.01) |
| *C08L 77/08* | (2006.01) |
| *C08L 77/10* | (2006.01) |
| *C08L 77/12* | (2006.01) |

(52) U.S. Cl.

CPC .................. *C08K 3/04* (2013.01); *C08K 7/06* (2013.01); *C08L 101/00* (2013.01); *C08K 2201/004* (2013.01); *C08L 33/24* (2013.01); *C08L 77/00* (2013.01); *C08L 77/02* (2013.01); *C08L 77/04* (2013.01); *C08L 77/06* (2013.01); *C08L 77/08* (2013.01); *C08L 77/10* (2013.01); *C08L 77/12* (2013.01)

(58) Field of Classification Search

None

See application file for complete search history.

(56) References Cited

U.S. PATENT DOCUMENTS

| | | | | |
|---|---|---|---|---|
| 2016/0145419 | A1* | 5/2016 | Takano | C08K 3/04 524/607 |
| 2016/0297120 | A1* | 10/2016 | Lamberts | C08L 23/0884 |
| 2017/0275458 | A1* | 9/2017 | Lee | B29C 45/0001 |

FOREIGN PATENT DOCUMENTS

| | | | |
|---|---|---|---|
| JP | 2016540067 | A | 12/2016 |
| JP | 2021055198 | A | 4/2021 |
| JP | 2022185442 | A | 12/2022 |
| KR | 101928196 | B1 | 12/2018 |
| KR | 20210037909 | A | 4/2021 |

* cited by examiner

*Primary Examiner* — Eli D. Strah

(74) *Attorney, Agent, or Firm* — Lempia Summerfield Katz LLC

(57) ABSTRACT

A polyamide resin composition using a recycled carbon fiber to establish reasonable manufacturing costs. The polyamide resin composition has excellent processability and can be used for injection molding, so that molded products with various structures can be made from the polyamide resin composition. In addition, good mechanical properties of the polyamide resin composition enable applications in various fields.

10 Claims, No Drawings

POLYAMIDE RESIN COMPOSITION

CROSS REFERENCE TO RELATED APPLICATION

The present application claims priority to Korean Patent Application No. 10-2022-0129424, filed Oct. 11, 2022, the entire contents of which is incorporated herein for all purposes by this reference.

BACKGROUND OF THE DISCLOSURE

1. Field of the Disclosure

The present disclosure relates to a polyamide resin composition.

2. Description of the Related Art

Regulations on greenhouse gas reduction and recycling of resources have been strengthened across the country and in each industry due to various environmental issues and the Paris agreement. Particularly, regulations on chemical products and plastics are no exception. Yet, in order to reinforce stiffness and various functions of engineering plastics, various types of reinforcing agents are used. Among the above reinforcing agents, carbon fibers are used in thermosetting resins and thus are mostly disposed of as waste after being used. This is because remolding the carbon fibers is difficult, even after the end of the life cycle.

The statements in this BACKGROUND section merely provide background information related to the present disclosure and may not constitute prior art.

SUMMARY

An objective of the present disclosure is to apply a recycled carbon fiber, recovered from across the industries, to a polyamide resin to apply to an actual product.

Objectives of the present disclosure are not limited to the objectives mentioned above. The above and other objectives of the present disclosure become more apparent from the following description, and are realized by the appended claims, and combinations thereof.

The polyamide resin composition, according to the present disclosure, may include a polyamide resin, a first carbon fiber including a recycled carbon fiber, and a second carbon fiber including polyacrylonitrile (PAN)-based fiber, pitch-based fiber, rayon-based fiber, lignin-based fiber, cellulose-based fiber, and polyethylene-based fiber.

The polyamide resin may include polyamide 6, polyamide 12, polyamide 66, polyamide 6/66, polyamide 6/12, polyamide 6/6T, polyamide 6/6I, or combinations thereof.

The polyamide resin may be regenerated from waste fibers, waste fabrics, waste films, waste fishing nets, or combinations thereof.

The polyamide resin may have a relative viscosity in a range of 2.0 to 3.3.

The first carbon fiber may be provided in the form of a chopped fiber.

The first carbon fiber may have a length in a range of 3 mm to 15 mm.

A weight ratio of the first carbon fiber to the second carbon fiber may be in a range of 4:6 to 6:4.

The second carbon fiber may be provided in the form of a chopped fiber.

The second carbon fiber has a length in a range of 3 mm to 15 mm.

The polyamide resin composition may include an amount of 60% to 80% by weight of the polyamide resin, an amount of 10% to 20% by weight of the first carbon fiber, and an amount of 8% to 20% by weight of the second carbon fiber, with respect to 100% by weight of the entire composition.

The polyamide resin composition may further include an additive.

The polyamide resin composition may include 0.1% to 1% by weight of the additive.

A polyamide resin composition, according to the present disclosure, uses a recycled carbon fiber to establish reasonable manufacturing costs. The polyamide resin composition has excellent processability and can be used for injection molding, so that molded products with various structures can be made from the polyamide resin composition. In addition, good mechanical properties of the polyamide resin composition enable applications in various fields.

Effects of the present disclosure are not limited to the effects mentioned above. It should be understood that the effects of the present disclosure include all effects which can be deduced from the following description.

DETAILED DESCRIPTION

Above objectives, other objectives, features, and advantages of the present disclosure are understood from the following embodiments associated with the accompanying drawings. However, the present disclosure is not limited to the embodiments described herein and may be embodied in other forms. The embodiments described herein are provided so that the disclosure can be made thorough and complete and that the spirit of the present disclosure can be fully conveyed to those skilled in the art. Throughout the drawings, like elements are denoted by like reference numerals. In the accompanying drawings, the dimensions of the structures are larger than actual sizes for clarity of the present disclosure. Terms used in the specification, “first,” “second,” etc., may be used to describe various components, but the components are not to be construed as being limited to the terms. These terms are used only for the purpose of distinguishing a component from another component. For example, without departing from the scope of the present disclosure, a first component may be referred as a second component, and a second component may be also referred to as a first component. The singular expression includes the plural expression unless the context clearly indicates otherwise. Further, the terms “comprises,” “includes,” or “has,” when used in this specification, specify the presence of stated features, regions, integers, steps, operations, elements, and/or components, but do not preclude the presence or addition of one or more other features, regions, integers, steps, operations, elements, components, and/or combinations thereof. Also, when an element such as a layer, film, area, or sheet is referred to as being “on” another element, it can be directly on the other element, or intervening elements may be present therebetween. Similarly, when an element such as a layer, film, area, or sheet is referred to as being “under” another element, it can be directly under the other element, or intervening elements may be present therebetween. Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases. Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

A polyamide resin composition, according to the present disclosure, may include a polyamide resin, a first carbon fiber, and a second carbon fiber.

Hereinafter, each component of the composition is described in detail.

Polyamide Resin

Existing waste carbon fibers May be used in thermosetting resins, so there is a problem in that the carbon fibers are difficult to be reused after the end of the life cycle. Therefore, the present disclosure is characterized in that a carbon fiber is applied to the polyamide resin, which is a thermoplastic resin, to enable recycling after the end of the life cycle.

The polyamide resin may include polyamide 6, polyamide 12, polyamide 66, polyamide 6/66, polyamide 6/12, polyamide 6/6T, polyamide 6/6I, or combinations thereof.

The polyamide resin may be regenerated from waste fibers, waste fabrics, waste films, waste fishing nets, or combinations thereof. For example, the polyamide resin may be regenerated from airbag residues (foam paper).

The polyamide resin may have a relative viscosity in a range of 2.0 to 3.3. In this case, the relative viscosity is a value obtained by measuring a relative viscosity of a 100-mL sulfuric acid solution having a purity of 96% at a temperature of 20° C. added with the 1 g polyamide resin, with respect to a viscosity of a 100-mL sulfuric acid solution having a purity of 96% at a temperature of 20° C. When the relative viscosity of the polyamide resin is less than 2.0, dimensional stability may be insufficiently improved. In addition, when the relative viscosity of the polyamide resin exceeds 3.3, the flowability of the polyamide resin composition may be deteriorated, resulting in surface defects and short shots.

(B) First Carbon Fiber

Among reinforcing agents used to reinforce stiffness and various functions of engineering plastics, the carbon fibers are mainly used as reinforcements of composite materials. In addition, the carbon fibers are used with matrices to support external loads.

However, carbon fiber-reinforced thermosetting composite materials (carbon fiber-reinforced thermosetting plastic) are difficult to remold, so most of the composite materials are disposed of as waste after being used. In such waste disposal, various harmful gases are inevitably generated during incineration, which is extremely non-environmental. Therefore, research on the application of carbon fibers to carbon fiber-reinforced thermoplastic resins capable of being remolded, and the technology of recycling the carbon fibers with eco-friendly treatments have been actively conducted. As a result, the application of carbon fibers as one type of reinforcing supporters has gradually increased across industries.

The carbon fibers used as such a reinforcing material are raw materials that require enormous costs and energy in production. In addition, the disposal of waste generated during processes or products to which the carbon fibers are applied, having fulfilled their function as parts, has emerged as an extremely difficult problem. Types of the carbon fibers used in the actual industry are provided in the form of carbon fiber-reinforced plastics (CFRP) to which thermosetting resins are applied. In certain examples, carbon fibers in such a form may be disposed of in landfills, which causes scattering of carbon fibers in the process of decomposing resins from carbon fibers and environmental pollution caused by energy, carbon dioxide, and the like. As a result, there is a limitation in the reuse of the waste carbon fibers.

The first carbon fiber, according to the present disclosure, may include a recycled carbon fiber as described above. The first carbon fiber may be obtained by processing the carbon fiber-reinforced plastics (CFRP) through processing methods including a decomposition method of superheated steam and a decomposition method of solvent. The decomposition method of superheated steam and the decomposition method of solvent may be performed in a manner widely used in the related art. For example, in the decomposition method of superheated steam, oxygen or steam may be injected to remove a sizing agent from a surface of the carbon fiber. In addition, the decomposition method of solvent is a method using chemical depolymerization, and a strong acid, a strong base, a transition metal salt, or the like may be used to remove the sizing agent from the surface of the carbon fiber.

The first carbon fiber may be provided in the form of a chopped fiber.

The first carbon fiber may be in a state where the sizing agent being treated before recycling is completely removed. The sizing agent may include a coupling agent including a polyurethane resin, an epoxy resin, a polyimide resin, a phenolic resin, an aminosilane-based resin, or a combination thereof. When such a sizing agent is incompletely removed from the surface of the carbon fiber, the sizing agent may act as an impurity. As a result, adhesion to the polyamide resin bonded during processing may be reduced, thereby deteriorating physical properties.

The first carbon fiber may have a length in a range of 3 mm to 15 mm. The recycled carbon fiber is likely to be provided in the form of fiber bundles or tapes, so there may be problems in that the length and the width of the carbon fiber are irregular. Therefore, the first carbon fiber may have a length in the range of 3 mm to 15 mm, which is advantageous for extrusion and processing.

(C) Second Carbon Fiber

The second carbon fiber, according to the present discourse, serves as the reinforcing agent. The recycled carbon fiber, which is the first carbon fiber, may cause deterioration in physical properties due to recycling. To solve the above problem, the first carbon fiber and the second carbon fiber are used together by mixing.

In this case, the first carbon fiber and the second carbon fiber may be mixed in a weight ratio in a range of 4:6 to 6:4 to establish reasonable manufacturing costs and obtain the balance of physical properties.

The second carbon fiber may include polyacrylonitrile (PAN)-based fiber, pitch-based fiber, rayon-based fiber, lignin-based fiber, cellulose-based fiber, and polyethylene-based fiber.

The second carbon fiber may be provided in the form of a chopped fiber.

The second carbon fiber may have a length in a range of 3 mm to 15 mm. The above range is a range for minimizing the carbon fiber breakage when extruding pellets, which are raw materials for the injection process. When the length of the second carbon fiber is less than 3 mm, the physical properties of the polyamide resin composition may be insufficiently improved. In addition, when the length of the second carbon fiber exceeds 15 mm, there may be difficulties in preparing the composition due to insufficient input to a feeder during the extrusion process.

A surface of the second carbon fiber may be a surface treated with a coupling agent including a polyurethane resin, an epoxy resin, a polyimide resin, a phenolic resin, or a combination thereof.

(D) Additive

The polyamide resin composition, according to the present disclosure, may further include the additive.

The additive may include a plasticizer, a photodegradation inhibitor, a heat-resistant agent, an antioxidant, a releasing agent, a dye, a pigment, an ultraviolet absorber, a nucleating agent, a lubricant, or a combination thereof.

The polyamide resin composition, according to the present disclosure, may include 60% to 80% by weight of the polyamide resin, 10% to 20% by weight of the first carbon fiber, 8% to 20% by weight of the second carbon fiber, and 0.1% to 1% by weight of the additive, with respect to 100% by weight of the entire composition.

In another aspect, the present disclosure relates to a molded product produced from the above-described polyamide resin composition.

The use of the molded product is not limited to the field in which the molded product is used. In addition, the molded product may be applied to press molding in the form of a mat or nonwoven fabric.

Hereinafter, the present disclosure is described in detail with reference to the following Examples and Comparative Examples. However, the spirit of the present disclosure is not limited thereto.

Preparation Example: Preparation of Polyamide Resin Composition

Each component was mixed with a twin-screw extruder to prepare a polyamide resin composition at a temperature in a range of 240° C. to 300° C. In this case, in order to mix the polyamide resin composition to the maximum, the extruder with three inlets was used. A polyamide resin, a first carbon fiber, and a second carbon fiber were put into a primary inlet, a secondary inlet, and a tertiary inlet, respectively. In addition, the polyamide resin composition was prevented from thermal decomposition by minimizing the residence time during melt mixing. The rotational speed of the screw was adjusted in a range of 150 rotations per minute (rpm) to 800 rpm with consideration of the dispersibility of the polyamide resin composition.

Experimental Example: Comparison of Physical Properties of Polyamide Resin Composition The polyamide resin compositions of Examples 1 to 10 and Comparative Examples 1 to 7 were prepared with the components and amounts shown in Table 1 below. The results are shown in Table 2.

TABLE 1

| | Polyamide resin | | | First carbon fiber Processing method | | | |
|---|---|---|---|---|---|---|---|
| | Polyamide 6 | Polyamide 66 | Regen. polyamide 66 | Decomp. method of superheated steam | Decomp. method of solvent | Second carbon fiber | Additive |
| Ex. 1 | 80 | | | 8 | | 12 | |
| Ex. 2 | 80 | | | 10 | | 10 | |
| Ex. 3 | 80 | | | 12 | | 8 | |
| Ex. 4 | 80 | | | | 8 | 12 | |
| Ex. 5 | 80 | | | | 10 | 10 | |
| Ex. 6 | 80 | | | | 12 | 8 | |
| Ex. 7 | | 80 | | | 10 | 10 | |
| Ex. 8 | | | 80 | | 10 | 10 | |
| Ex. 9 | 80 | | | | 10 | 10 | 0.5 |
| Ex. 10 | 70 | | | | 12 | 18 | |
| Comp. Ex. 1 | 80 | | | | | 20 | |
| Comp. Ex. 2 | 80 | | | | 20 | | |
| Comp. Ex. 3 | 80 | | | 20 | | | |
| Comp. Ex. 4 | 80 | | | | 14 | 6 | |
| Comp. Ex. 5 | 80 | | | 14 | | 6 | |
| Comp. Ex. 6 | 70 | | | | | 30 | |
| Comp. Ex. 7 | 70 | | | | 21 | 9 | |

Polyamide 6: Media 2400 was used as nylon 6.

Polyamide 66: Vydyne 50BWFS was used as nylon 66.

Regenerated polyamide 66: Airbag residues purchased from the airbag division of KOLON INDUSTRIES Inc. in Gyeongsan plant was used.

First carbon fiber: The first carbon was purchased from HANSTECH INTERNATIONAL.

Second carbon fiber: CF702 purchased from SUNYOUNG INDUSTRY was used.

Additive: Ethylene-bis-stearmide (HI-LUBE) purchased from SIWON CHEMICAL CO. was used as a releasing agent, and songanox1010 purchased from SONGWON INDUSTRIAL was used as a heat-resistant agent.

Evaluation Method

Tensile strength: Tensile strength was evaluated in accordance with ISO 527.

Flexural strength: Flexural strength was evaluated in accordance with ISO 178.

Flexural Modulus: Flexural Modulus was evaluated in accordance with ISO 178.

Impact strength: Impact strength was evaluated in accordance with ISO 180.

Tensile strength retention rate compared to second carbon fiber: Tensile strength retention rate was evaluated according to a ratio of the first carbon fiber applied to the polyamide resin composition to which 20% by weight of the second carbon fiber (prepared in Comparative Example 1) was applied.

Tensile strength retention rate (%) compared to second carbon fiber=[(tensile strength according to application ratio of first carbon fiber)/(tensile strength of polyamide resin composition to which 20% by weight of second carbon fiber is applied)]*100 [Equation 1]

TABLE 2

| | Tensile strength (MPa) | Flexural strength (MPa) | Flexural modulus (MPa) | Impact strength (kJ/m$^2$) | First carbon fiber:Second carbon fiber (weight ratio) | Tensile strength retention rate compared to second carbon fiber (%) |
|---|---|---|---|---|---|---|
| Example 1 | 210 | 284 | 15100 | 8.6 | 4:6 | 95.8 |
| Example 2 | 203 | 276 | 14790 | 8.0 | 5:5 | 92.6 |
| Example 3 | 200 | 270 | 14340 | 7.8 | 6:4 | 91.3 |
| Example 4 | 203 | 275 | 14840 | 8.4 | 4:6 | 92.6 |
| Example 5 | 198 | 270 | 14540 | 7.9 | 5:5 | 90.4 |
| Example 6 | 195 | 267 | 14250 | 7.7 | 6:4 | 87.7 |
| Example 7 | 203 | 280 | 14840 | 8.1 | 5:5 | 100 |
| Example 8 | 200 | 278 | 14530 | 8.2 | 5:5 | 99.9 |
| Example 9 | 198 | 281 | 14070 | 8.0 | 5:5 | 90.4 |
| Example 10 | 223 | 310 | 19404 | 7.7 | 4:6 | 92.9 |
| Comparative Example 1 | 219 | 290 | 15300 | 9.1 | 0:10 | 100 |
| Comparative Example 2 | 170 | 238 | 12240 | 5.5 | 10:0 | 77.6 |
| Comparative Example 3 | 182 | 252 | 12690 | 7.2 | 10:0 | 83.1 |
| Comparative Example 4 | 175 | 263 | 13910 | 6.5 | 7:3 | 79.9 |
| Comparative Example 5 | 181 | 284 | 14452 | 7.1 | 7:3 | 82.6 |
| Comparative Example 6 | 240 | 320 | 19800 | 8.9 | 10:0 | 100 |
| Comparative Example 7 | 215 | 300 | 17820 | 6.5 | 3:7 | 89.6 |

Referring to the evaluation results of the physical properties in Table 2, the polyamide resin compositions prepared in Examples 1 to 10 had physical properties not inferior to the polyamide resin composition prepared in Comparative Example 1 even though as the first carbon fiber, the recycled carbon fiber was used instead of high-priced carbon fiber. In addition, it was confirmed that the polyamide resin compositions prepared in Examples 1 to 10 had superior physical properties to the polyamide resin compositions prepared in Comparative Examples 2 to 7.

As a result, the polyamide resin composition, according to the present disclosure, uses the recycled carbon fiber to establish reasonable manufacturing costs. The polyamide resin composition has excellent processability and can be used for injection molding, so that molded products with various structures can be made from the polyamide resin composition. In addition, good mechanical properties of the polyamide resin composition enable applications in various fields.

Although the embodiments of the present disclosure have been disclosed for illustrative purposes, those skilled in the art will appreciate that various modifications, additions, and substitutions are possible, without departing from the scope and spirit of the disclosure as described in the accompanying claims. Therefore, the embodiments of the present disclosure have been described for illustrative purposes and should not be construed as being restrictive.

What is claimed is:

1. A polyamide resin composition comprising:

60% to 80% by weight of a polyamide resin;

10% to 20% by weight of a first carbon fiber comprising a recycled carbon fiber; and 8% to 20% by weight of a second carbon fiber, with respect to 100% by weight of an entire composition, wherein the second carbon fiber comprises a polyacrylonitrile (PAN)-based fiber, a pitch-based fiber, a rayon-based fiber, a lignin-based fiber, a cellulose-based fiber, a polyethylene-based fiber, or combinations thereof, and wherein a weight ratio of the first carbon fiber to the second carbon fiber is in a range of 4:6 to 6:4.

2. The polyamide resin composition of claim 1, wherein the polyamide resin comprises polyamide 6, polyamide 12, polyamide 66, polyamide 6/66, polyamide 6/12, polyamide 6/6T, polyamide 6/6I, or combinations thereof.

3. The polyamide resin composition of claim 1, wherein the polyamide resin is regenerated from waste fibers, waste fabrics, waste films, waste fishing nets, or combinations thereof.

4. The polyamide resin composition of claim 1, wherein the polyamide resin has a relative viscosity in a range of 2.0 to 3.3.

5. The polyamide resin composition of claim 1, wherein the first carbon fiber comprises a chopped fiber.

6. The polyamide resin composition of claim 1, wherein the first carbon fiber has a length in a range of 3 mm to 15 mm.

7. The polyamide resin composition of claim 1, wherein the second carbon fiber comprises a chopped fiber.

8. The polyamide resin composition of claim 1, wherein the second carbon fiber has a length in a range of 3 mm to 15 mm.

9. The polyamide resin composition of claim 1, further comprising:

an additive.

10. The polyamide resin composition of claim 9, wherein the polyamide resin composition comprises 0.1% to 1% by weight of the additive.

* * * * *